(12) United States Patent
Chang et al.

(10) Patent No.: US 10,883,888 B2
(45) Date of Patent: Jan. 5, 2021

(54) SYSTEMS AND METHODS FOR BALLISTIC IMPACT DETECTION AND TRAJECTORY ESTIMATION

(71) Applicant: Acellent Technologies, Inc., Sunnyvale, CA (US)

(72) Inventors: Fu-Kuo Chang, Stanford, CA (US); Irene Jhi-Sue Li, Stanford, CA (US); Jeffrey Dean Bergman, Santa Clara, CA (US); Grant Jin-Hau Chang, Stanford, CA (US); Franklin J. Li, Palo Alto, CA (US); Susheel Kumar Yadav, Santa Clara, CA (US)

(73) Assignee: Acellent Technologies, Inc., Sunnyvale, CA (US)

( * ) Notice: Subject to any disclaimer, the term of this patent is extended or adjusted under 35 U.S.C. 154(b) by 0 days.

(21) Appl. No.: 16/130,782

(22) Filed: Sep. 13, 2018

(65) Prior Publication Data

US 2019/0219459 A1    Jul. 18, 2019

Related U.S. Application Data

(60) Provisional application No. 62/558,202, filed on Sep. 13, 2017.

(51) Int. Cl.
| | | |
|---|---|---|
| *F41H 13/00* | (2006.01) | |
| *F41J 5/056* | (2006.01) | |
| *G01L 5/14* | (2006.01) | |
| *G01L 1/14* | (2006.01) | |
| *G01L 5/00* | (2006.01) | |

(52) U.S. Cl.
CPC ............ *G01L 1/146* (2013.01); *F41H 13/00* (2013.01); *F41J 5/056* (2013.01); *G01L 5/0052* (2013.01); *G01L 5/14* (2013.01)

(58) Field of Classification Search
None
See application file for complete search history.

(56) References Cited

U.S. PATENT DOCUMENTS

| | | | | |
|---|---|---|---|---|
| 6,563,763 | B2* | 5/2003 | McNelis | F41J 5/06 367/124 |
| 6,739,547 | B2* | 5/2004 | Redano | F41G 7/30 244/3.1 |
| 6,977,598 | B2* | 12/2005 | Longbottom | B64F 1/36 340/945 |
| 7,805,276 | B1* | 9/2010 | Byers | H01L 41/1132 310/311 |

(Continued)

*Primary Examiner* — Natalie Huls
*Assistant Examiner* — Jermaine L Jenkins
(74) *Attorney, Agent, or Firm* — Haley Guiliano LLP; Gregory Lundell; Jon Y. Ikegami

(57) ABSTRACT

In one embodiment, a sensor network is attached to a structure and employed to detect and analyze load changes such as impacts from projectiles. An analyzer coupled to the sensors can determine where on the structure the projectile impacted. Coupled with information on the origin point of the projectile, i.e. where it was fired from, the analyzer can then estimate the trajectory of the projectile. The analyzer can also determine whether the projectile passed through the structure and, if so, can extrapolate the estimated trajectory to determine an estimation of whether the projectile has also impacted an object behind the structure.

9 Claims, 6 Drawing Sheets

(56) References Cited

U.S. PATENT DOCUMENTS

| | | | |
|---|---|---|---|
| 8,079,247 B2* | 12/2011 | Russell | A42B 3/046 |
| | | | 73/12.01 |
| 8,194,501 B2* | 6/2012 | Damarla | G01S 5/22 |
| | | | 367/127 |
| 8,320,217 B1* | 11/2012 | Barger | F41G 3/147 |
| | | | 367/127 |
| 8,555,726 B2* | 10/2013 | Barger | G01H 11/08 |
| | | | 367/127 |
| 9,103,628 B1* | 8/2015 | Moraites | F41G 7/2293 |
| 9,360,370 B2* | 6/2016 | Moraites | G06T 7/70 |
| 2010/0020643 A1* | 1/2010 | Barger | F41G 3/147 |
| | | | 367/129 |
| 2011/0246069 A1* | 10/2011 | Peres | F41G 5/08 |
| | | | 701/530 |

* cited by examiner

SYSTEMS AND METHODS FOR BALLISTIC IMPACT DETECTION AND TRAJECTORY ESTIMATION

PRIORITY

This application claims priority to, and the benefit of, U.S. Provisional Application No. 62/558,202, which was filed on Sep. 13, 2017 and which is hereby incorporated by reference in its entirety.

BRIEF DESCRIPTION

The present disclosure relates generally to structural health monitoring. More specifically, the present disclosure relates to ballistic impact detection and trajectory estimation.

BACKGROUND

In certain situations, ballistic impact poses a serious threat to structures. In combat, for example, ballistic impacts from projectiles such as bullets, rockets and the like present great risk to various structures. Especially in mobile structures such as vehicles, it is desirable to know where ballistic impacts happened, and how much damage has occurred. Such information is valuable in determining, for example, the degree to which the vehicle has been compromised. Accordingly, continuing efforts exist to improve detection of ballistic impacts.

SUMMARY

Embodiments of the disclosure can be implemented in numerous ways, including as a method, a system, an apparatus, and a computer-readable medium. Various embodiments are discussed below.

In one embodiment, a system for detecting impact upon a structure comprises: transducers configured for coupling to positions on a mobile structure; and a processor in communication with the transducers. The processor is programmed to receive signals corresponding to output from the transducers, the output from the transducers corresponding to an impact upon the structure from a projectile. The processor is also programmed to calculate, from the received signals and positions of the transducers on the structure, a location of the impact on the structure. It is further programmed to receive an origin position of the projectile, and calculate a trajectory of the projectile according to the received origin position and the location of the impact on the structure.

The processor may be further programmed to direct the transducers to transmit signals through the structure so as to determine whether the projectile penetrated into the structure.

The processor may be further programmed to direct the transducers to transmit signals through the structure so as to determine whether the projectile penetrated through the structure.

The processor may be further programmed to extrapolate the calculated trajectory of the projectile beyond the structure so as to predict a path of the projectile after it has passed through the structure.

The processor may be further programmed to extrapolate the calculated trajectory of the projectile beyond the structure and toward an extrapolated position, so as to predict whether the projectile has impacted upon another structure located at the extrapolated position.

The system may further comprise a flexible substrate having the transducers positioned thereon, the flexible substrate being configured for attachment to the structure.

In another embodiment, one or more non-transitory computer-readable storage media collectively store processor-executable instructions for estimating the trajectory of a projectile that has impacted a structure. The instructions are executable by a processor to receive signals corresponding to output from a plurality of transducers coupled to a structure, the output corresponding to an impact upon the structure from a projectile. The instructions are also executable by a processor to calculate, from the received signals and positions of the transducers on the structure, a location of the impact on the structure. Additionally, the instructions are executable by a processor to receive an origin position of the projectile, and calculate a trajectory of the projectile according to the received origin position and the location of the impact on the structure.

Other aspects and advantages of the disclosure will become apparent from the following detailed description taken in conjunction with the accompanying drawings which illustrate, by way of example, principles of the disclosure.

BRIEF DESCRIPTION OF THE DRAWINGS

The disclosure, together with further objects and advantages thereof, may best be understood by reference to the following description taken in conjunction with the accompanying drawings, in which.

Like reference numerals refer to corresponding parts throughout the drawings. Also, it is understood that the depictions in the figures are diagrammatic and not necessarily to scale.

DETAILED DESCRIPTION

In one embodiment of the disclosure, a sensor network is attached to a structure and employed to detect and analyze load changes such as impacts from projectiles. An analyzer coupled to the sensors can determine where on the structure the projectile impacted. Coupled with information on the origin point of the projectile, i.e. where it was fired from, the analyzer can then estimate the trajectory of the projectile. The analyzer can also determine whether the projectile passed through the structure and, if so, can extrapolate the estimated trajectory to determine an estimation of whether the projectile has also impacted an object behind the structure.

Figure 1:
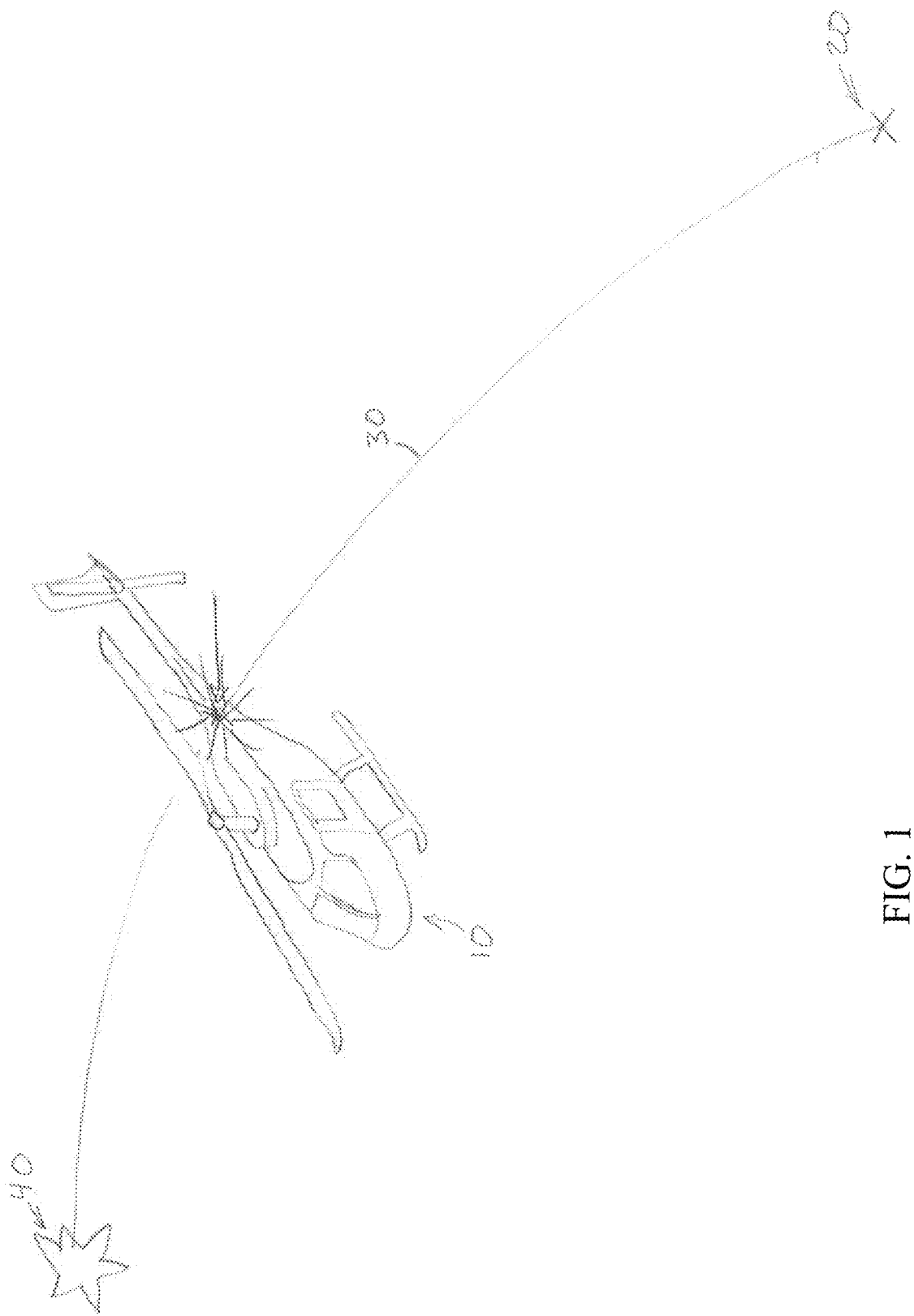
FIG. 1 illustrates operation of embodiments of the disclosure.

FIG. 1 illustrates operation of embodiments of the disclosure. Here, a structure 10 such as a helicopter is impacted by a projectile shot from an origin point 20. The trajectory 30 of the projectile is shown as the curved line extending from origin point 20 and extending through the structure 10, landing at termination point 40. A network of sensors, described further below, is affixed to structure 10. When the projectile impacts the structure 10, the sensor network detects the impact and determines its location on the structure. Assuming the origin point 20 is known, that information coupled with the determined impact location allows for estimation of the trajectory 30. The sensor network also allows for determination of whether the projectile has passed through the structure 10. If the sensor network determines that the projectile has passed through the structure 10, the estimated trajectory can be extrapolated beyond the structure 10 to estimate the termination point 40 and/or whether it intersects with any other known structure along the extrapolated trajectory.

The sensor network may be any collection of sensors capable of detecting the impact of projectiles upon a structure. As one example, they may be an array of piezoelectric transducers that, when coupled to a structure, convert stress waves detected in the structure to electrical signals. The electrical signals thus indicate impact upon a structure. The transducers also convert electrical signals applied thereon to stress waves in the structure, allowing the transducers to query the structure by transmitting stress waves therethrough and detecting changes in the stress waves as they propagate through the structure. The operation of these transducers is described further below. The transducers can also be affixed to a flexible diagnostic layer for ease of installation, which is also further described below.

Figure 2A:
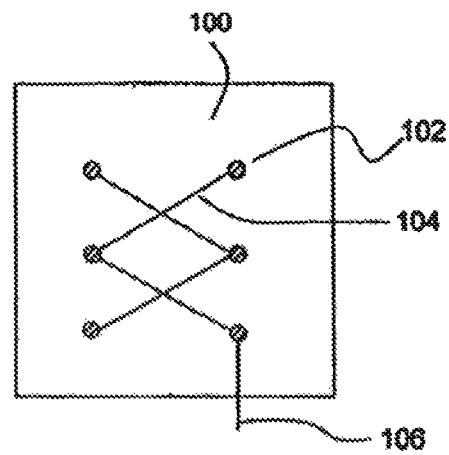
FIG. 2A illustrates a top view of a sensing layer manufactured in accordance with embodiments of the disclosure.

Construction and operation of these transducers, and analysis networks employing them, is further described in, for example, U.S. Pat. No. 7,458,266 to Beard et al., which is hereby incorporated by reference in its entirety and for all purposes. FIG. 2A illustrates a sensor network coupled to a flexible diagnostic layer for use in accordance with embodiments of the present invention. Such a diagnostic layer can be affixed to, e.g., structure 10 and employed to determine projectile impact occurrence and location, and further used in estimation and extrapolation of trajectory 30.

A diagnostic layer 100 is shown, which contains an array of transducers 102. As above, the transducers 102 can act as sensors capable of receiving signals used in structural health monitoring such as stress waves, and also as actuators capable of generating vibration, and are connected to conductive traces 104. The traces 104 connect (or interconnect, if necessary) transducers 102 to one or more output leads 106 configured for connection to a processor or other device capable of analyzing the data derived from the sensors 102. Accordingly, the transducers 102 can both passively generate electrical signals in response to stress waves, and actively transmit stress waves when a voltage is applied to them.

The diagnostic layer 100 and its operation are known, and further described in U.S. Pat. No. 6,370,964 to Chang et al., which is hereby incorporated by reference in its entirety and for all purposes. Construction of the diagnostic layer 100 is also explained in U.S. Pat. No. 7,413,919 to Qing et al., which is also incorporated by reference in its entirety and for all purposes. It should be noted that the present invention is not limited to the embodiments disclosed in the aforementioned U.S. Pat. No. 7,413,919. Rather, any network of sensors and actuators can be employed, regardless of whether they are incorporated into a flexible substrate or not. The invention simply contemplates sensors and actuators that are attached to structures in any manner that allows for analysis according to the methods described herein. One of skill will realize that many different approaches exist for attaching sensors and actuators to a structure, not all of which employ flexible substrates. Accordingly, the diagnostic layers illustrated herein are used for purposes of convenience only, and sensor networks that do not employ layers can be employed as well.

Figure 2B:
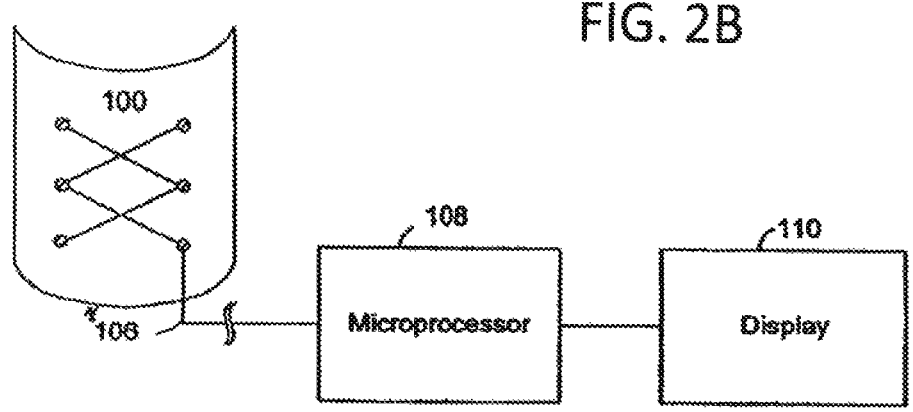
FIGS. 2B-2C illustrate block and circuit diagrams, respectively, describing elements of a sensing layer and their operation.

FIG. 2B further describes aspects of the operation of the diagnostic layer 100. In operation, the output leads 106 are electrically connected to an analysis unit such as a microprocessor 108, suitable for analyzing signals from the sensors 102. In certain embodiments, the flexible layer 100 is first attached to a structure in a manner that allows the sensing elements 102 to detect quantities related to the health of the structure. For instance, the sensors 102 can be sensors configured to detect stress waves propagated within the structure, and emit electrical signals accordingly. The microprocessor 108 then analyzes these electrical signals to assess various aspects of the health of the structure. For instance, detected stress waves can be analyzed to detect holes, dents, pits, crack propagation within the structure, delamination within composite structures, or the likelihood of fatigue-related failure. Quantities such as these can then be displayed to the user via display 110.

Figure 2C:
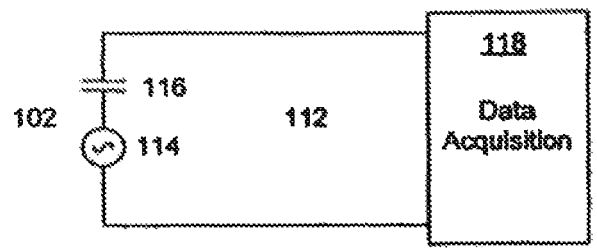

As above, in one embodiment, the sensors 102 can be piezoelectric transducers capable of reacting to a propagating stress wave by generating a voltage signal. Analysis of these signals highlights properties of the stress wave, such as its magnitude, propagation speed, frequency components, and the like. Such properties are known to be useful in structural health monitoring. FIG. 2C illustrates a circuit diagram representation of such an embodiment. This embodiment can often be represented as a circuit 112, where each sensor 102 is represented as a voltage source 114 in series with a capacitor 116 (impedance circuitry) used to adjust signal strength. This pair is in electrical contact with a data acquisition unit 118, such as a known data acquisition card employed by microprocessors 108 (the data acquisition unit 118 can be thought of as a component interface to the microprocessor 108). Propagating stress waves induce the sensor 102 to emit a voltage signal that is recorded by the data acquisition unit 118, where it can be analyzed to determine the health of the structure in question. As discussed below, these piezoelectric transducers can also act as actuators, converting an applied voltage to a stress wave signal. In another embodiment, the sensors 102 can be known fiber optic sensors that convert stress waves to optical signals.

Figure 3A:
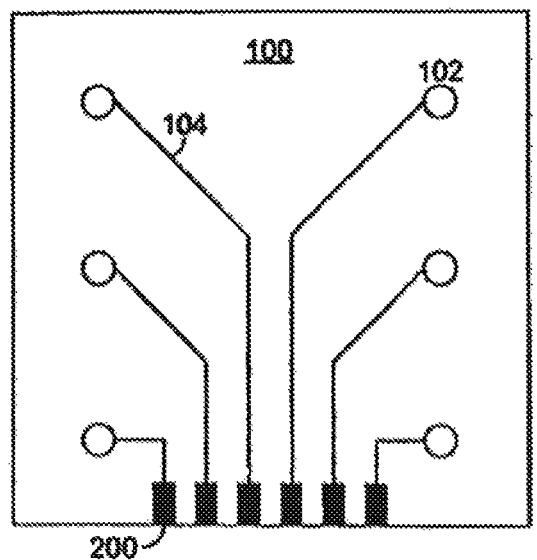
FIG. 3A illustrates a top view highlighting further details of a sensing layer having a two-dimensional array of sensors.
Figure 3B:
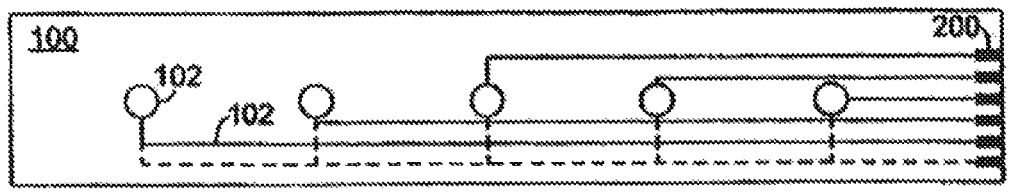
FIG. 3B illustrates a top view highlighting further details of a sensing layer having a one-dimensional array of sensors.

FIG. 3A illustrates further details of a sensing layer 100. It should be noted that embodiments of the disclosure include sensing layers 100 configured in any number of ways. For instance, the sensors 102 can be distributed in any manner throughout the layer 100. Here, six such sensors 102 are shown regularly distributed in a two-dimensional array, each with a single trace 104 extending to the contacts 200. However, one of skill will observe that the sensors 102, traces 104, and contacts 200 can be distributed in any manner, and in any number, without departing from the scope of the invention. For example, the sensors 102 can also be configured in a one-dimensional array such as that shown in FIG. 3B. Here, instead of two rows of sensors 102, a single row is employed. Such a one-dimensional array finds uses in, for example, the monitoring of areas too narrow to fit a two-dimensional array.

Figure 4:
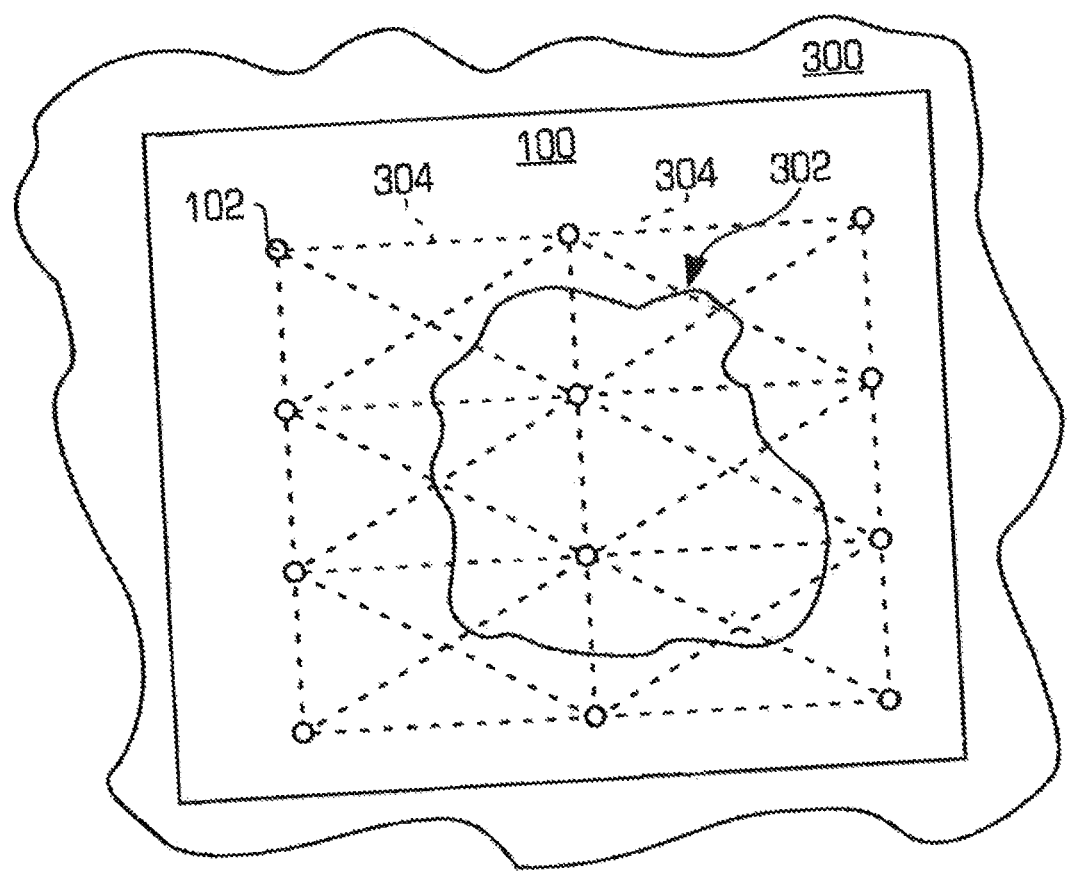
FIG. 4 illustrates a sensing layer and sensors/actuators configured to analyze a damage region of a structure in accordance with embodiments of the disclosure.

FIG. 4 illustrates a diagnostic layer 100 and sensors/actuators configured to analyze a damage region of a structure in accordance with embodiments of the present invention. The diagnostic layer 100 is attached to a structure 300, which may be an enlarged portion of structure 10, allowing it to detect and analyze damage regions 302 via transducers 102 that can be either passive sensors or actuators.

The location and size of the damage region are determined according to at least three methods, although any method may be employed for embodiments of the disclosure. In the first "through path" method, stress waves are sent along paths directly between pairs of sensors/actuators. If this path intersects a portion of the damage region, the stress waves are altered. The manner in which these stress waves are altered is then used to determine the size and location of the damage region. While this method analyzes those stress waves that travel directly through the damage region, the second method, or "reflection" approach, instead analyzes those stress waves that are reflected from the damage region. The properties of these reflected stress waves are then analyzed according to triangulation or other methods, so as to determine the size and location of the damage region. The third, or "phased array" method, involves synchronizing multiple stress waves from different actuators, so as to generate a focused stress wave that propagates along a particular path. If this path intersects the damage region, a reflected stress wave will be detected. Multiple focused stress waves are directed along different paths of the structure. In this manner, a series of beams is "swept" across the structure, and the location and size of the damage region is determined according to any corresponding reflected stress waves.

In the through path approach, stress waves are sent out by various ones of the sensors/actuators 102. Those stress waves sent along paths 304 that do not intersect the damage region 302 will remain unchanged, while those stress waves sent along paths 304 that do intersect the damage region 302 will be altered. Such altered signals indicate which paths 304 intersect the damage region 302, in turn offering an indication of the location of the damage region 302 as well as an indication of its size (the greater the number of paths 304 that intersect the damage region 302, the larger the damage region 302 is). Also, passing through the damage region 302 typically alters the stress waves in such a manner that their energy is reduced. This reduction in energy can then be analyzed to determine the approximate severity of the damage done, which together with the number of paths 304 gives a more complete assessment of the "size" of the damage region, both in terms of the amount of area on the structure 300 that is affected, as well as how badly that area is affected. Reduction to zero energy may indicate a hole, i.e. a region in which no signal can pass through. Thus, for instance, the methods of the invention can determine the location of a damage region 302 on a structure 300, the physical size of the damage region 302, and how badly that region is damaged. The methods of the invention can thus pinpoint a damage region 302 and determine its size, as measured both by its physical dimensions and how badly the structure 300 has been affected. The invention can thus distinguish between damage regions 302 that are large but relatively mild (e.g., a large but shallow dent), and small but severe damage regions 302 that may actually be of more concern (e.g., a small hole in the structure, or a short but deep crack).

In the reflection approach, paths 304 are not directly analyzed. Instead, actuators 102 emit stress waves, some of which reflect off the damage region 302. These reflected stress waves are then analyzed to determine the size and location of the damage region 302. While the invention contemplates various analysis methods, one embodiment employs triangulation. In this approach, three different actuators/sensors 102 are employed. Each transmits a stress wave whose reflection is detected by the other two. The times of flight (i.e., the times between transmission of stress waves, and reception of their reflections) of each of these reflected waves, along with the positions of each of the three actuators/sensors 102, are used along with the wave velocity to triangulate the location of the damage region 302. Similar to the through path approach, the energy reduction in the reflected waves is also calculated and can be used to determine the size and severity of the damage region 302.

In the phased array approach, multiple actuators 102 emit stress waves with predetermined phase differences so as to focus a composite beam upon a predetermined point, thereby forming a stress wave beam along a specified direction. Some embodiments can employ known ray acoustics methods to generate such a beam. In other embodiments, actuators 102 can employ known digital beamforming or other methods to generate such directional beams. In essence, directional stress waves are sent out from the actuators 102, with reflections indicating whether, and how far away, a damage region 302 was encountered. The structure can effectively be swept with multiple directional stress waves, to get a complete picture of the size, shape, and location of the damage region 302.

Because certain embodiments allow for devices that can function as both sensors and actuators, it should be noted here that the methods of the invention can be practiced with devices that are used in this dual role. That is, while sensing is described as being performed by groups of sensors and stress wave generation is described as being performed by groups of actuators, it is possible for any device to be used as a sensor during detection of a load change, and as both a sensor and an actuator during the subsequent location/size analysis. Also, it is to be understood that, in many embodiments, the terms "sensor" and "actuator" can be used to describe any device shown on layer 100, and references to groups of sensors or groups of actuators can include any such device, even if the groups include common devices.

Figure 5:
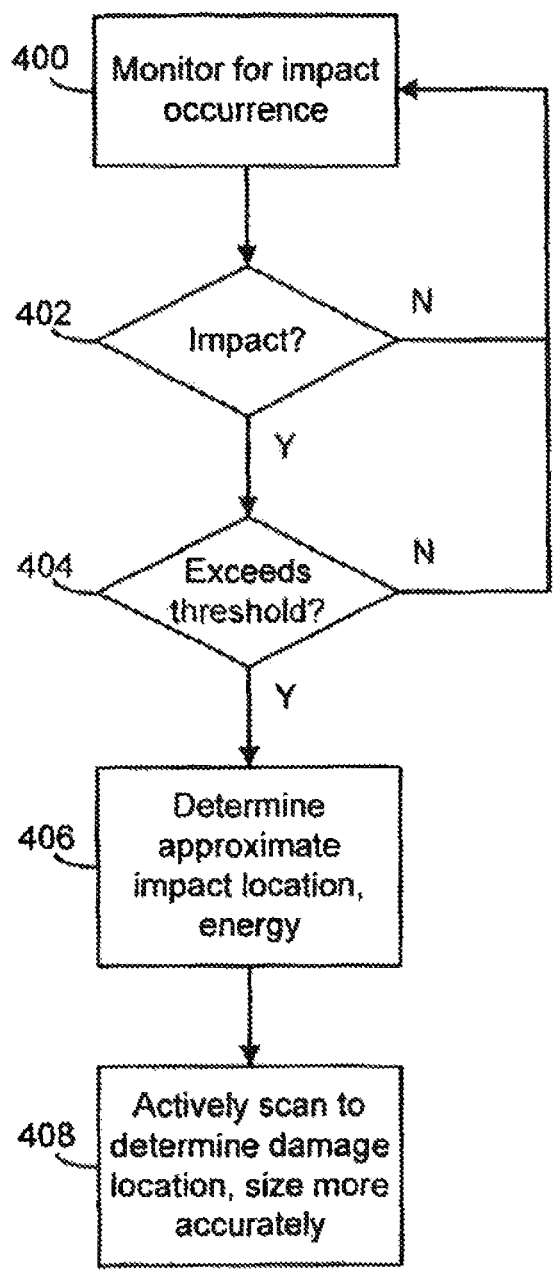
FIG. 5 illustrates process steps in the detection and analysis of a damage region.

FIG. 5 illustrates process steps in the detection and analysis of a damage region 302. Once the layer 100 is installed on the structure 300, it can monitor the structure for the presence of an impact (step 400). To conserve energy, this step can be performed with passive sensors 102, rather than actively via the actuators 102. More specifically, the sensors 102 simply generate a voltage upon exposure to the stress waves generated by an impact upon the structure. When an impact or other load change of concern is accordingly detected (step 402), the processor 108 determines whether the load change exceeds some threshold indicating a load change that requires further analysis (step 404). The exact threshold, or thresholds, used are not central to the disclosure, and any may be used. For instance, the threshold may be a critical value of stress wave magnitude or energy, a combination of both, or a duration over which the stress wave energy exceeds a certain amount.

Once the threshold is exceeded, the responses from all passive sensors 102 are employed to determine the load change's approximate location and energy (step 406). The methods and apparatuses involved in carrying out this step are known, and further described in U.S. Pat. No. 7,430,911 to Qing et al., which is hereby incorporated by reference in its entirety and for all purposes.

While it is useful to determine information regarding the load change that caused the damage, it is often more useful to determine the extent of the damage caused by that load change. To that end, the actuators 102 also emit stress waves to determine the location and size of the damage region more accurately (step 408). As above, such a determination can be made by a through path analysis, a reflection analysis, or a phased array approach in known manner.

In operation, one or more diagnostic layers 100 are placed on surfaces of structure 10 in locations, as known to one of ordinary skill in the art, that allow the sensors 102 thereon to accurately detect impact and determine damage location. The microprocessor 108 may then determine impact location from impacts detected by sensors 102. If an origin point 20 is entered into the microprocessor 108, it may then estimate trajectory 30 and, if the sensors 102 also detect that the projectile has passed through structure 10, extrapolate trajectory 30 to estimate further collisions of the projectile.

Figure 6:
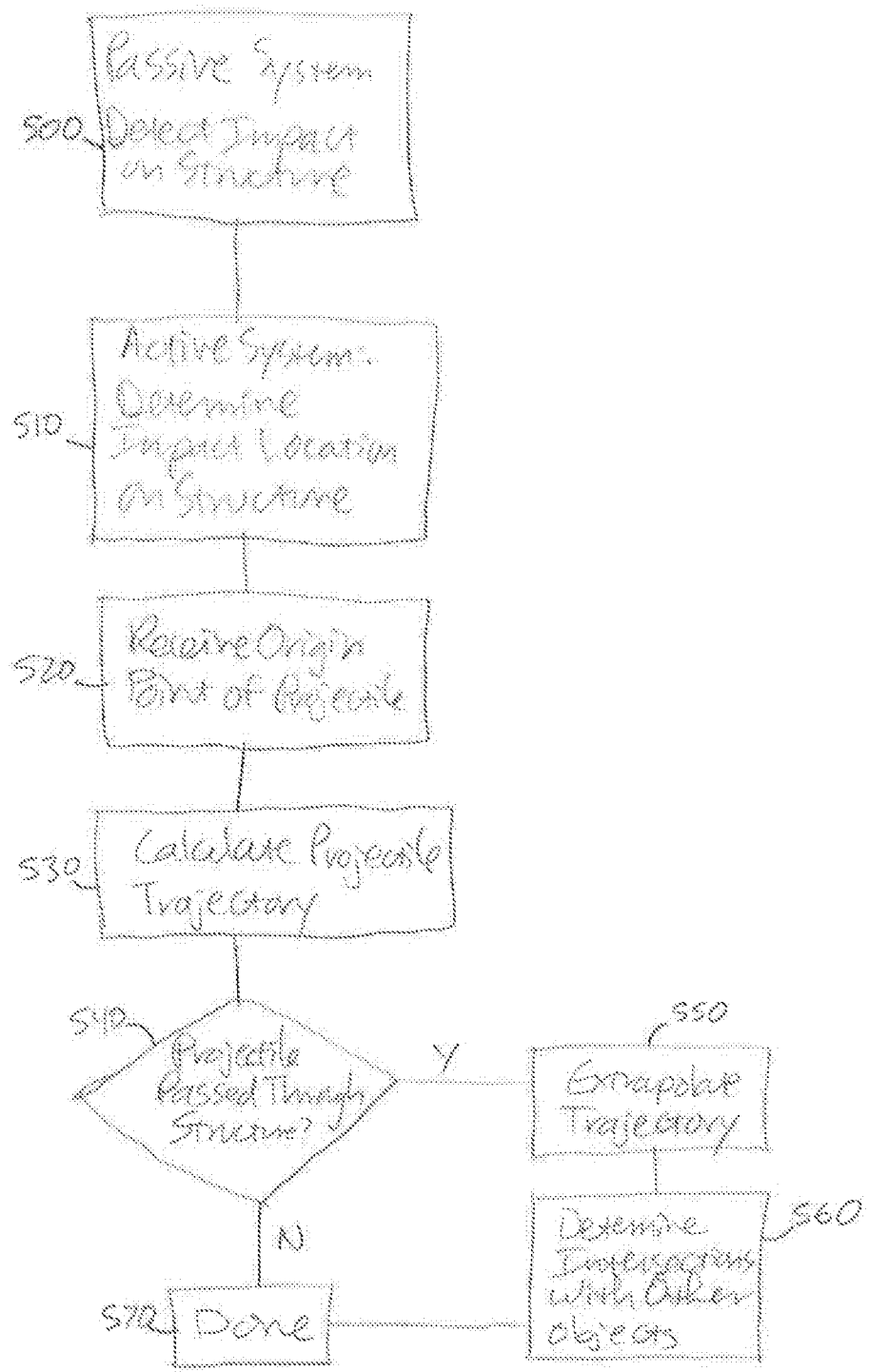
FIG. 6 illustrates process steps in trajectory calculation and extrapolation, in accordance with embodiments of the disclosure.

FIG. 6 illustrates process steps in trajectory calculation and extrapolation, in accordance with embodiments of the disclosure. The system described in FIG. 2B can be conceptualized as a passive system together with an active system. More specifically, the passive system may passively detect impact, i.e. detect stress waves propagating through structure 10 due to impact of a projectile, without actively generating any diagnostic stress waves. This passive system determines the approximate location of the impact, as described above. After the passive system has determined the presence and approximate location of the impact, the active system actively queries the structure, i.e. actively transmits diagnostic stress waves through the structure near the impact location, to determine the extent of damage to the structure. The extent or severity of damage, and its more precise location, may be determined by the active system according to, e.g., one or more of the three damage evaluation methods described above. As is known, these and other methods may be used to determine the size and severity of the damage caused by impact of the projectile, including whether the projectile has created a hole in the structure 10.

When impact occurs, the passive system may detect the projectile's impact upon structure 10 (Step 500). In particular, the sensors 102 are distributed across the structure 10, with those sensors 102 nearest the impact point detecting stress waves of greatest magnitude. This provides an estimate of the impact's location. That is, for example, those sensors 102 that detect stress waves of greatest magnitude, or those that first detect stress waves, are employed along with other nearby sensors 102 to actively query the estimated impact location. The active querying determines a more precise location of the impact point on the structure 10, as well as the severity of damage (Step 510). Querying of the structure 10 can be performed according to any of the methods described above, or any other method capable of generating an accurate estimate of damage location and severity.

The microprocessor 108 may also receive data on the origin point 20 of the projectile that impacted structure 10 (Step 520). Such information may be provided by, for example, a third party system or service with spotters that relay enemy positions, or a satellite- or aircraft-based surveillance system. Alternatively, surveillance systems on structure 10 itself may be able to locate the origin point 20 and estimate its location via, for example, laser rangefinding or the like. Any method for determining the origin point of a projectile is contemplated.

Once the microprocessor 108 has the position of origin point 20 and the location of the projectile's impact on structure 10, along with the position of structure 10 in 3D-space (perhaps by global positioning system (GPS) coordinates of structure 10), the trajectory of the projectile may be estimated (Step 530). Trajectory estimation may be performed in any known manner. For example, the trajectory may be estimated as the straight-line path between the origin point 20 and impact point on structure 10. This may be sufficiently accurate in some instances. A more accurate estimate may be a calculation of the parabolic trajectory of an object when the initial velocity and orientation of the projectile are known or estimated. That is, if the third party system or service can estimate the initial velocity and orientation of the projectile in addition to its origin point 20, the true parabolic trajectory of the projectile can be estimated in known manner.

The sensors 102 may be placed on multiple surfaces of structure 10. In this manner, they may detect whether the projectile has passed through structure 10 (Step 540). For example, the microprocessor 108 may determine that the projectile has passed into the structure 10 if one hole is detected, and may determine that the projectile has passed through the structure 10 if two holes are detected on different surfaces of structure 10 within some predetermined time period. Any method for determining whether a projectile has passed through a structure may be employed.

If it is determined that the projectile has passed through the structure 10, it may be desirable to extrapolate the trajectory of the projectile to determine whether it went on to impact or otherwise endanger another object after passing through structure 10. Accordingly, after the trajectory is estimated in Step 530, this trajectory can be extrapolated to any point beyond structure 10 (Step 550). In particular, the estimated trajectory can be extrapolated far enough out to determine whether it intersects any known locations of other objects of interest (Step 560). Thus, for example, if the topology in the vicinity of structure 10 is known, the termination point 40 may be determined as the point at which the extrapolated trajectory intersects with the surface. This may be able to determine whether, for example, locations of ground troops or installations were hit by the projectile. Once intersections with other known objects are determined, or if it was determined at Step 540 that the projectile did not pass through structure 10, the process of FIG. 6 may end (Step 570).

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present invention are presented for purposes of illustration and description. They are not intended to be exhaustive or to limit the invention to the precise forms disclosed. Many modifications and variations are possible in view of the above teachings. For example, any sensors may be employed in any configuration. Furthermore, trajectories may be estimated and extrapolated in any manner. The embodiments were chosen and described in order to best explain the principles of the invention and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A system for detecting impact upon a structure, the system comprising:
   transducers configured for coupling to positions on a mobile structure; and
   a processor in communication with the transducers, the processor being programmed to:
      direct the transducers to transmit signals through the structure so as to determine whether the projectile penetrated into the structure;
      receive signals corresponding to output from the transducers, the output from the transducers corresponding to an impact upon the structure from a projectile;
      calculate, from the received signals and positions of the transducers on the structure, a location of the impact on the structure;
      receive an origin position of the projectile; and
      calculate a trajectory of the projectile according to the received origin position and the location of the impact on the structure.

2. The system of claim 1, wherein the processor is further programmed to direct the transducers to transmit signals through the structure so as to determine whether the projectile penetrated through the structure.

3. The system of claim 1, wherein the processor is further programmed to extrapolate the calculated trajectory of the projectile beyond the structure so as to predict a path of the projectile after it has passed through the structure.

4. The system of claim 3, wherein the processor is further programmed to extrapolate the calculated trajectory of the projectile beyond the structure and toward an extrapolated position, so as to predict whether the projectile has impacted upon another structure located at the extrapolated position.

5. The system of claim 1, further comprising a flexible substrate having the transducers positioned thereon, the flexible substrate being configured for attachment to the structure.

6. One or more non-transitory computer-readable storage media collectively storing processor-executable instructions for estimating the trajectory of a projectile that has impacted a structure, the instructions being executable by a processor to:
   direct the transducers to transmit signals through the structure so as to determine whether the projectile penetrated into the structure;
   receive signals corresponding to output from a plurality of transducers coupled to a structure, the output corresponding to an impact upon the structure from a projectile;
   calculate, from the received signals and positions of the transducers on the structure, a location of the impact on the structure;
   receive an origin position of the projectile; and
   calculate a trajectory of the projectile according to the received origin position and the location of the impact on the structure.

7. The one or more non-transitory computer-readable storage media of claim 6, further comprising instructions to direct the transducers to transmit signals through the structure so as to determine whether the projectile penetrated through the structure.

8. The one or more non-transitory computer-readable storage media of claim 6, further comprising instructions to extrapolate the calculated trajectory of the projectile beyond the structure so as to predict a path of the projectile after it has passed through the structure.

9. The one or more non-transitory computer-readable storage media of claim 8, wherein the instructions to extrapolate further comprise instructions to extrapolate the calculated trajectory of the projectile beyond the structure and toward an extrapolated position, so as to predict whether the projectile has impacted upon another structure located at the extrapolated position.

\* \* \* \* \*